(12) United States Patent
Kometani et al.

(10) Patent No.: US 6,404,096 B1
(45) Date of Patent: Jun. 11, 2002

(54) ALTERNATING CURRENT GENERATOR FOR VEHICLE

(75) Inventors: Haruyuki Kometani; Yoshihito Asao; Masahiko Fujita; Katsumi Adachi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 44 days.

(21) Appl. No.: 09/635,005

(22) Filed: Aug. 8, 2000

(30) Foreign Application Priority Data

Feb. 7, 2000 (JP) .................. P. 2000-029356

(51) Int. Cl.[7] .................. H02K 1/22; H02K 19/22
(52) U.S. Cl. .................. 310/263; 310/42; 310/261
(58) Field of Search .................. 310/263, 254, 310/261, 268, 42, 216; 29/596–598

(56) References Cited

U.S. PATENT DOCUMENTS

| | | | | |
|---|---|---|---|---|
| 3,571,639 A | * | 3/1971 | Tiltins | 310/112 |
| 4,201,930 A | * | 5/1980 | Inagaki et al. | 310/51 |
| 4,780,637 A | * | 10/1988 | Wolcott | 310/263 |
| 4,972,114 A | * | 11/1990 | Frister | 310/263 |
| 5,708,318 A | * | 1/1998 | Fudono | 310/263 |
| 6,114,793 A | * | 9/2000 | Asao et al. | 310/263 |
| 6,310,416 B1 | * | 10/2001 | Chang | 310/263 |

FOREIGN PATENT DOCUMENTS

JP 54-134309 10/1979 ............ H02K/1/22

* cited by examiner

*Primary Examiner*—Tran Nguyen
(74) *Attorney, Agent, or Firm*—Sughrue Mion, PLLC

(57) ABSTRACT

The generator comprises a stator core 4 in which a three-phase stator coil 5 is wound and inserted into slots, a first rotor core 8 and a second rotor core 9 which are provided in the side of an inner diameter of this stator core 4 and rotate with a rotating shaft 7, a field coil 10 for magnetizing these first and second rotor cores 8 and 9 in different magnetic poles, and a plurality of magnetic poles 23 and 24 which are provided so as to extend to an axial direction of the rotating shaft 7 from the first and second rotor cores 8 and 9 and are arranged so as to have engagement alternately through predetermined gaps 25 and 26 between the magnetic poles and are opposite to the surface of the inner diameter of the stator core 4, and it is configured so that these magnetic poles 23 and 24 have a plurality of parts 23a, 24a and 23b, 24b in the axial direction and are stepwise formed and the respective parts are set to different widths in a rotational direction.

6 Claims, 12 Drawing Sheets

ELECTRICAL ANGLE OF HALF OF ONE-SIDED MAGNETIC POLE (deg.)

SUPERIMPOSITION OF 11-ORDER AND 13-ORDER HIGHER HARMONICS

GAP BETWEEN MAGNETIC POLES

ALTERNATING CURRENT GENERATOR FOR VEHICLE

BACKGROUND OF THE INVENTION

This invention relates to an alternating current generator for vehicle having a rotor of claw pole type.

Figure 13:
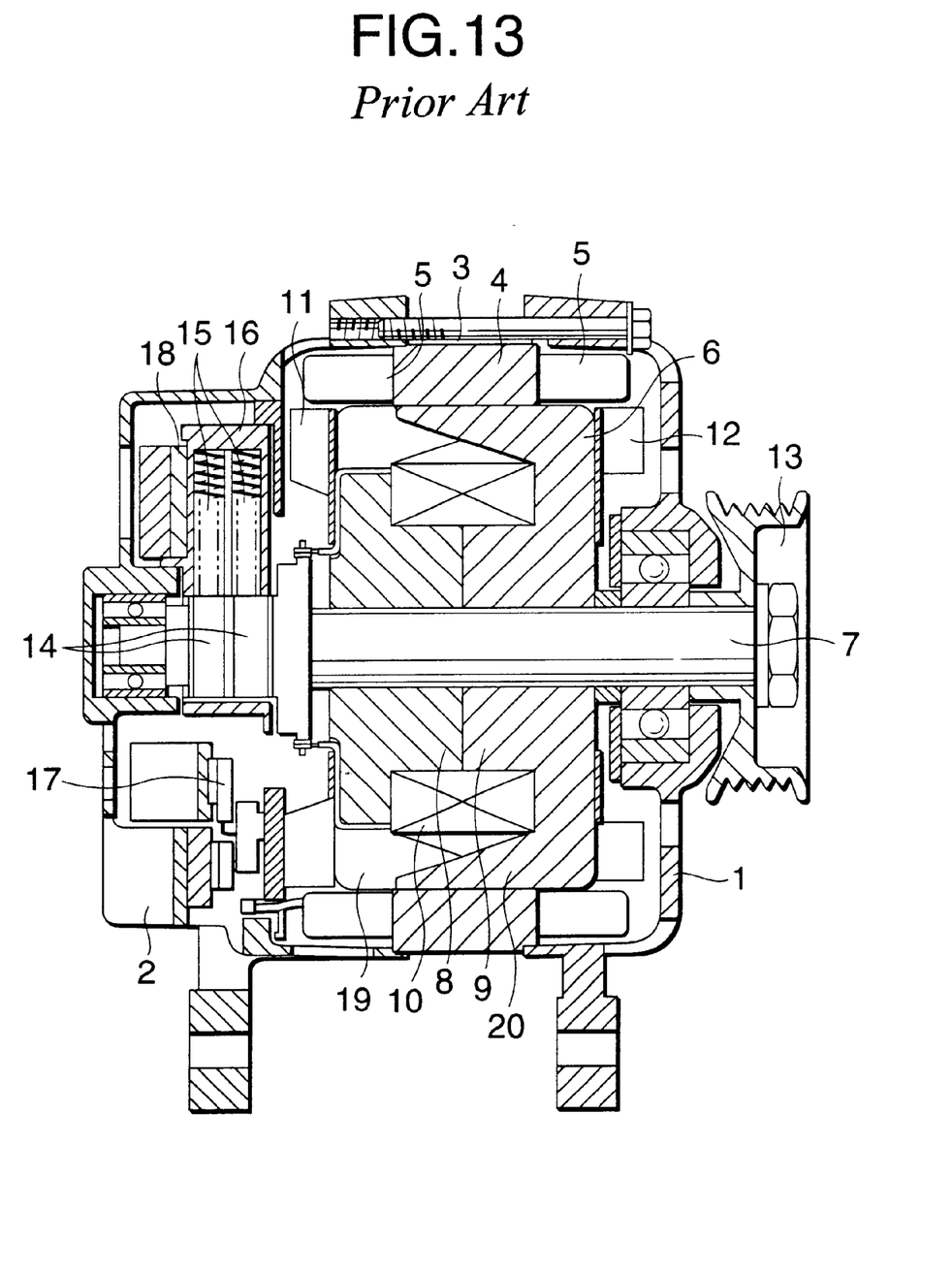
FIG. 13 is a sectional view showing a configuration of a conventional alternating current generator for vehicle.
Figure 14:
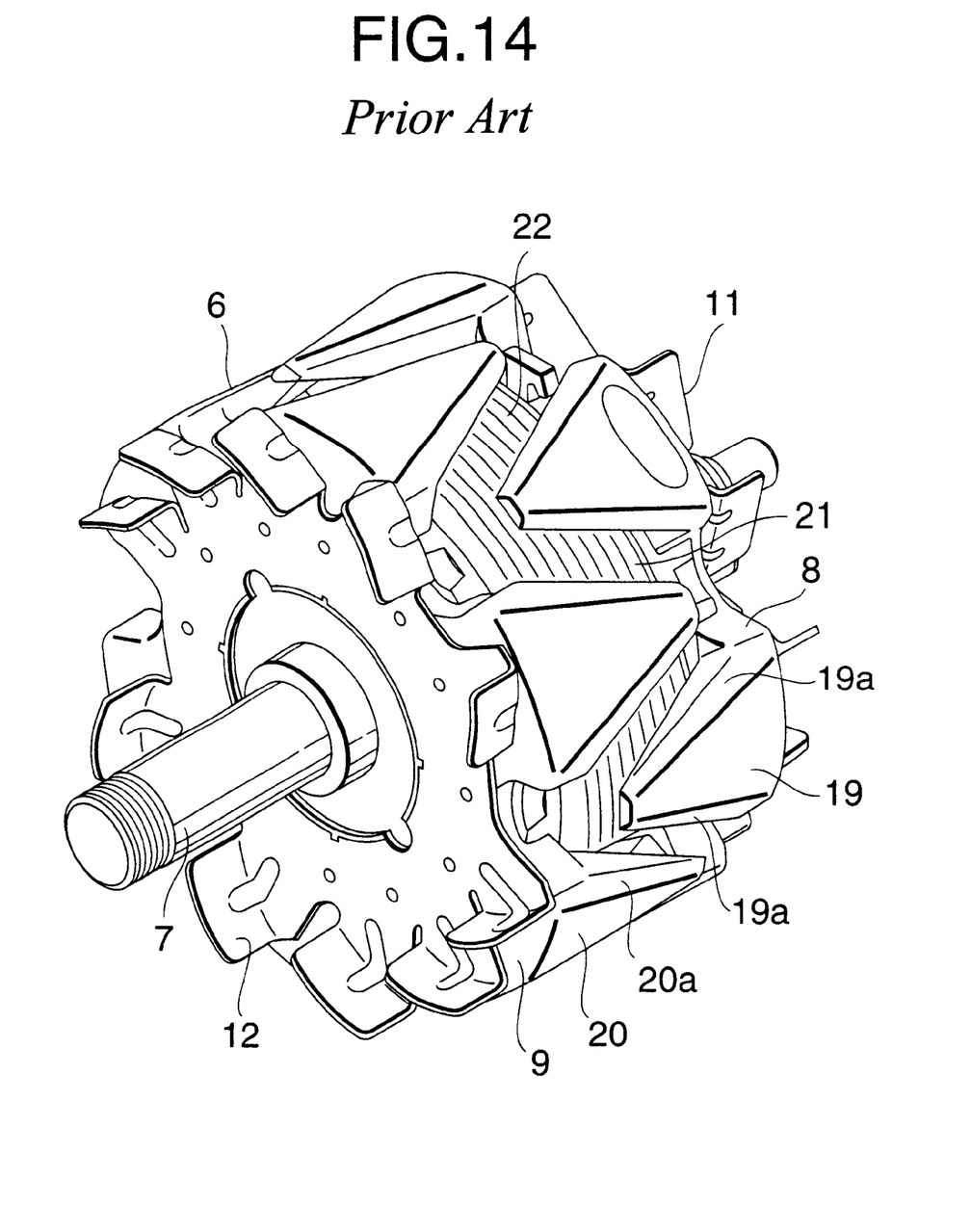
FIG. 14 is a perspective view showing a configuration of a rotor of the conventional alternating current generator for vehicle.
Figure 15:
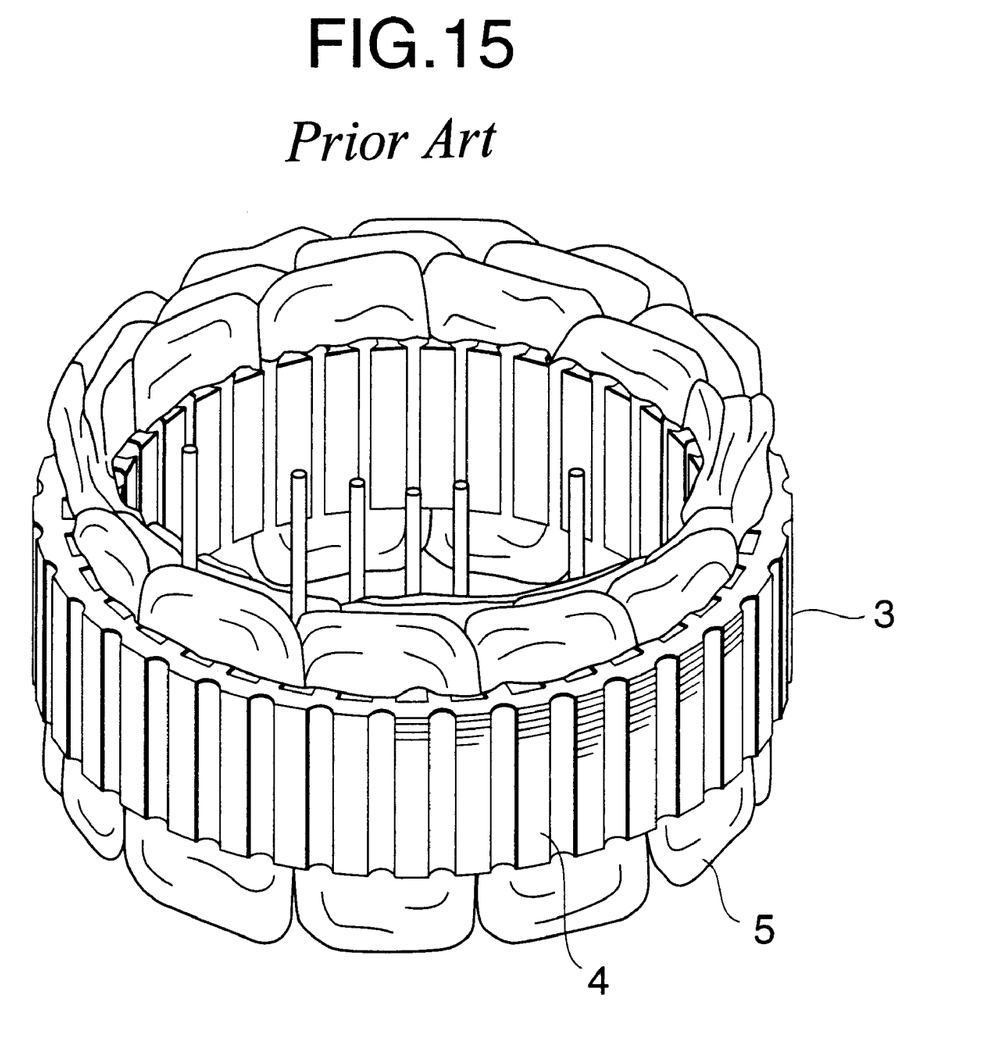
FIG. 15 is a perspective view showing a configuration of a stator of the conventional alternating current generator for vehicle.
Figure 16:
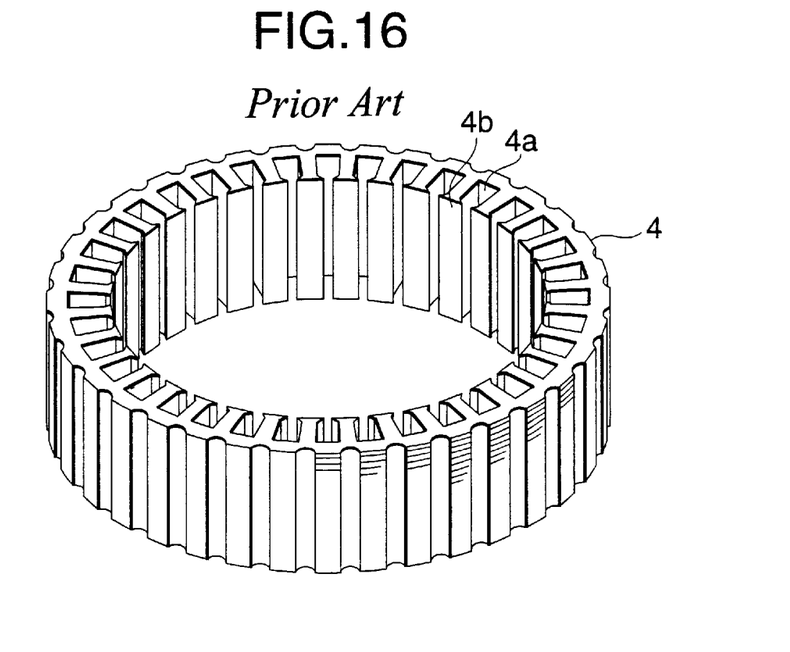
FIG. 16 is a perspective view of a stator core of the conventional alternating current generator for vehicle.
Figure 17:
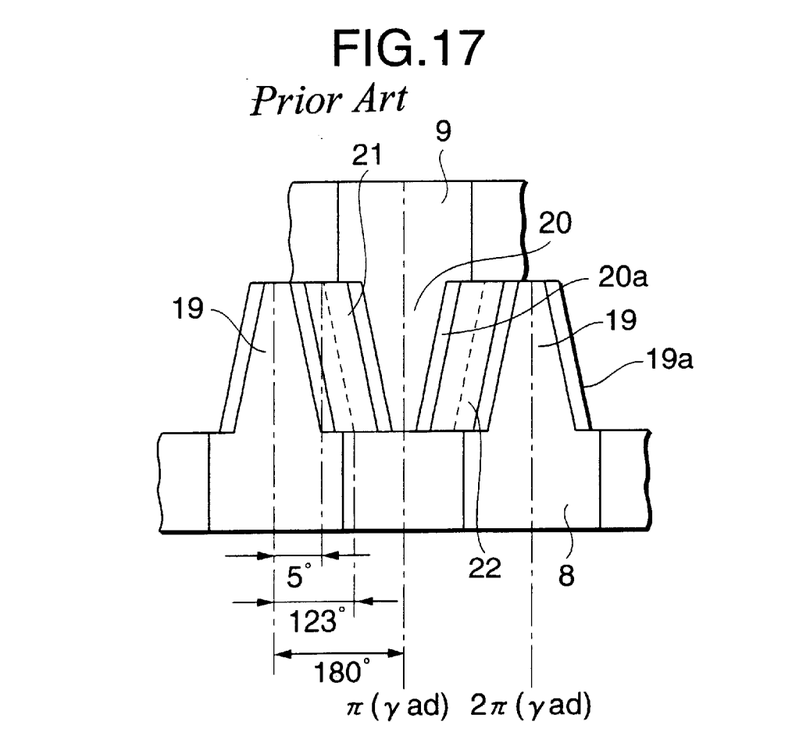
FIG. 17 is a plane view showing a shape of magnetic poles of the conventional alternating current generator for vehicle.

FIGS. 13 to 17 show a configuration of a conventional alternating current generator for vehicle. FIG. 13 is a sectional view of the generator, and FIG. 14 is a perspective view of a rotor, and FIG. 15 is a perspective view of a stator, and FIG. 16 is a perspective view of a stator core, and FIG. 17 is a plane view showing a shape of magnetic poles of the rotor. In the drawings, numeral 1 is a front bracket, and numeral 2 is a rear bracket, and numeral 3 is a stator sandwiched between the front bracket 1 and the rear bracket 2. The stator 3 comprises a stator core 4 and a three-phase stator coil 5 inserted into a slot 4a of the stator core 4 as shown in FIGS. 13, 15 and 16.

In FIGS. 13 and 14, numeral 6 is a rotor of claw pole type. The rotor 6 comprises a rotating shaft 7 whose both ends are supported by the front bracket 1 and the rear bracket 2, a first rotor core 8 and a second rotor core 9 mounted on this rotating shaft 7, a field coil 10 wound between both of the rotor cores 8 and 9, fans 11 and 12 provided in the back of both of the rotor cores 8 and 9, a pulley 13 provided outside the front bracket 1 side of the rotating shaft 7, and a slip ring 14 provided inside the rear bracket 2 side of the rotating shaft 7 for supplying a current to the field coil 10. Numeral 15 is a brush for supplying a current to the slip ring 14, and numeral 16 is a brush holder for holding this brush 15, and numeral 17 is a commutator for commutating alternating current output of the stator coil 5, and numeral 18 is a regulator for regulating a current of the field coil 10 to control an output voltage of the stator coil 5.

Numerals 19 and 20 are magnetic poles axially extending to the inner diameter of the stator core 4 from the first rotor core 8 and the second rotor core 9 through a predetermined air gap. A plurality of the magnetic poles 19 extending from the first rotor core 8 and the magnetic poles 20 extending from the second rotor core 9 are respectively provided according to the number of poles of the generator and are arranged so as to have engagement alternately through predetermined gaps 21 and 22 between the magnetic poles and are magnetized in north poles and south poles alternately by excitation of the field coil 10. Also, the magnetic poles 19 and 20 are formed into an isosceles trapezoid whose width is narrowed in the rotational direction toward the top end as shown in FIG. 17, and both the end surfaces of the rotational direction are formed in a straight line at a predetermined angle of inclination and thus, a line pitch between centerlines indicated by broken lines of the gaps 21 and 22 between the magnetic poles also changes in a straight line as shown in FIG. 17.

In order to improve efficiency of the generator generally, the centerlines indicated by the broken lines of the gaps 21 and 22 between the magnetic poles are set so as to incline in the range from about 60° to about 120° where an electrical angle between the adjacent magnetic poles 19 and 20 is set to 180° and, for example, the center of the magnetic pole 19 is set to 0° as shown in FIG. 17. Also, chamfered parts 19a and 20a for smoothing a magnetic flux density of the air gap formed between the magnetic poles 19, 20 and the stator core 4 and suppressing electromagnetic noise are formed in the corner of the outer surface opposite to the stator core 4 of the magnetic poles 19 and 20 and both the end surfaces of the rotational direction.

In the conventional alternating current generator for vehicle formed in this manner, when current is passed through the field coil 10 from a battery (not shown) mounted in the vehicle via the brush 15 and the slip ring 14, the magnetic poles 19 and 20 are excited alternately in the north pole and the south pole and the rotor 6 is driven by an internal combustion engine through the pulley 13 and thereby, the magnetic poles 19 and 20 give a rotating magnetic field to the stator core 4 and a three-phase alternating current voltage is generated in the stator coil 5 and this alternating current voltage is commutated by the commutator 17 for direct current and electric power is supplied to a load (not shown). Then, the regulator 18 holds an output voltage of the stator coil 5 to a constant value by controlling the passed current of the field coil 10.

In the alternating current generator for vehicle as described above, the rotating magnetic field given to the stator core 4 by the magnetic poles 19 and 20 is not a complete sine wave but a waveform including higher harmonics, and also an output current given to the load by power generation of the stator coil 5 is a current including higher harmonics. In operation of the generator, electromagnetic attraction force occurs between the magnetic poles 19, 20 and the stator core 4 due to interaction between the rotating magnetic field including higher harmonics and a magnetic field caused by an output current including higher harmonics, and this electromagnetic attraction force acts as applied vibration force, with the result that the stator core 4 and the magnetic poles 19, 20 vibrate to cause electromagnetic noise. Especially, a particular higher harmonic component among this electromagnetic noise interferes with quietness in the vehicle as abnormal sound, and various measures of noise have been taken.

For example, a technique disclosed in JP-A-54-134309 is also one of the measures of noise, and this technique notes that change in torque caused by periodic passage of the magnetic poles 19 and 20 arranged at regular pitches through the side of an inner diameter of teeth 4b arranged at regular pitches of the stator core 4 shown in FIG. 16 acts as applied vibration force to the stator core 4, and noise intends to be reduced by setting arrangement of the magnetic poles 19 and 20 at irregular pitches. According to this technique, the noise resulting from vibration the stator core 4 due to the change in torque is reduced, but the noise resulting from the electromagnetic attraction force between the stator core 4 and the magnetic poles 19, 20 cannot be reduced. Also, in this technique, for example, since the gaps 21 and 22 between the magnetic poles provided between the magnetic poles 19 and 20 shown in FIG. 14 are set at irregular pitches, the narrow gaps between the magnetic poles occur, so that there were side effects that a leakage magnetic flux between the magnetic poles 19 and 20 increases and output of the generator decreases.

The invention is implemented to solve such problems, and it is an object of the invention to obtain an alternating current generator for vehicle capable of effectively suppressing occurrence of abnormal sound without decrease in performance by reducing applied vibration force of higher harmonic components which can possibly become noise.

An alternating current generator for vehicle according to the invention comprises a stator core in which a three-phase stator coil is wound and inserted into slots, a first rotor core and a second rotor core which are provided in the side of an inner diameter of this stator core and rotate with a rotating shaft, a field coil for magnetizing these first and second rotor cores in different magnetic poles, and a plurality of magnetic poles which are provided so as to extend to an axial direction of the rotating shaft from the first and second rotor cores and are arranged so as to have engagement alternately through predetermined gaps between the magnetic poles and also are opposite to the surface of the inner diameter of the stator core through an air gap, and by forming these magnetic poles in a stepwise shape having a plurality of parts in the axial direction and setting the respective parts to different widths in a rotational direction, a pitch of the rotational direction between centerlines of the gaps between the adjacent magnetic poles is configured so as to change stepwise in the axial direction.

Also, the pitch of the rotational direction between the centerlines of the gaps between the adjacent magnetic poles is set to the range from 200° to 220° in a first part and the range from 140° to 160° in a second part using an electrical angle. Further, the pitch of the rotational direction between the centerlines of the gaps between the adjacent magnetic poles is set to the range from 220° to 230° in a first part, the range from 190° to 200° in a second part, the range from 160° to 170° in a third part and the range from 130° to 140° in a fourth part using an electrical angle.

Also, an alternating current generator for vehicle comprises a stator core in which a three-phase stator coil is wound and inserted into slots, a first rotor core and a second rotor core which are provided in the side of an inner diameter of this stator core and rotate with a rotating shaft, a field coil for magnetizing these first and second rotor cores in different magnetic poles, and a plurality of magnetic poles which are provided so as to extend to an axial direction of the rotating shaft from the first and second rotor cores and are arranged so as to have engagement alternately through predetermined gaps between the magnetic poles and also are opposite to the surface of the inner diameter of the stator core through an air gap, and these magnetic poles are formed in a substantially trapezoid shape of taper to the axial direction and also a part with a large angle of inclination to the axial direction is provided in the center of the axial direction and the axial length of this part is set to 30% or shorter to the whole axial length of the magnetic poles.

Further, corners formed by the surface opposite to the inner diameter of the stator core of the magnetic poles and both sides of the rotational direction are chamfered. Furthermore, the number of slots per phase every pole provided in the stator core is one. Also, the number of slots per phase every pole provided in the stator core is two.

DETAILED DESCRIPTION OF THE PREFERRED EMBODIMENTS

First Embodiment

Figure 1:
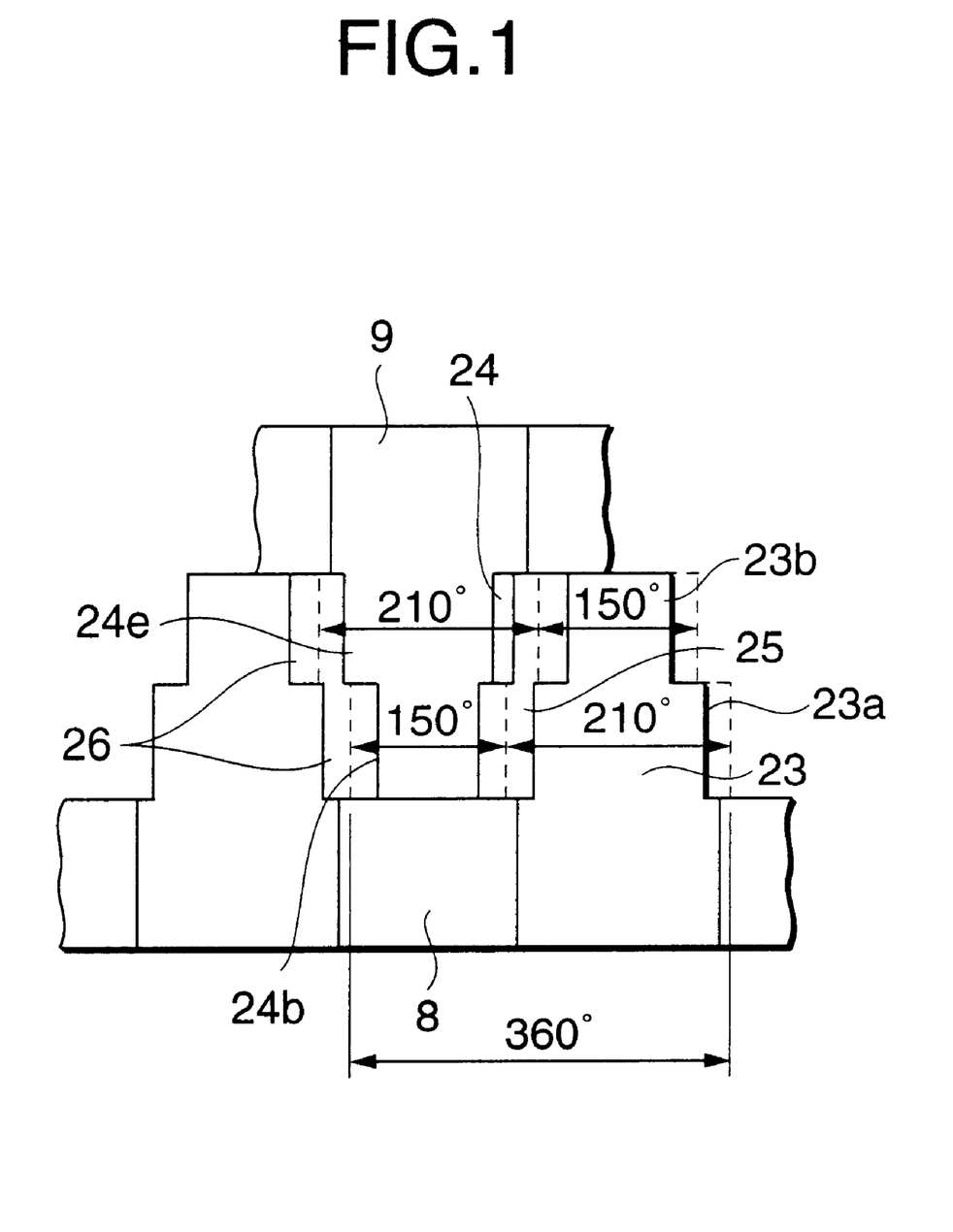
FIG. 1 is a plane view showing a shape of magnetic poles of an alternating current generator for vehicle of a first embodiment according to this invention.
Figure 2:
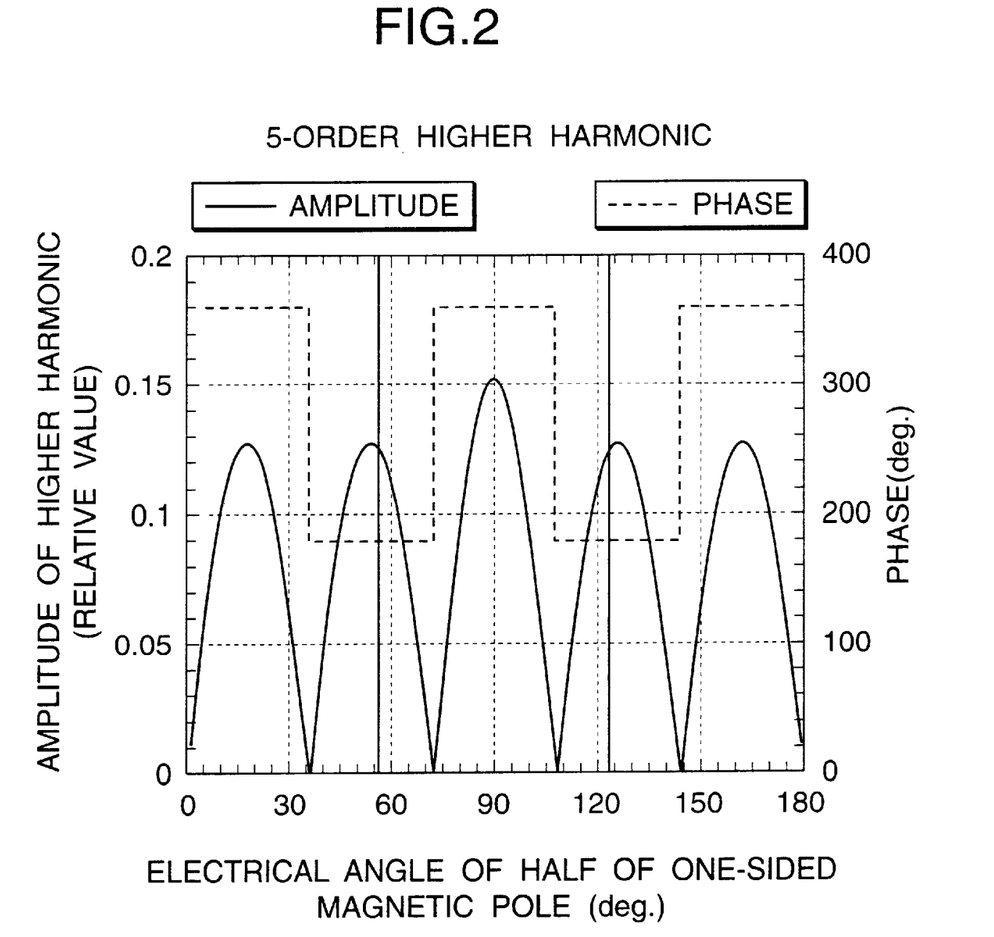
FIG. 2 is an illustration of the alternating current generator for vehicle of the first embodiment according to the invention.
Figure 3:
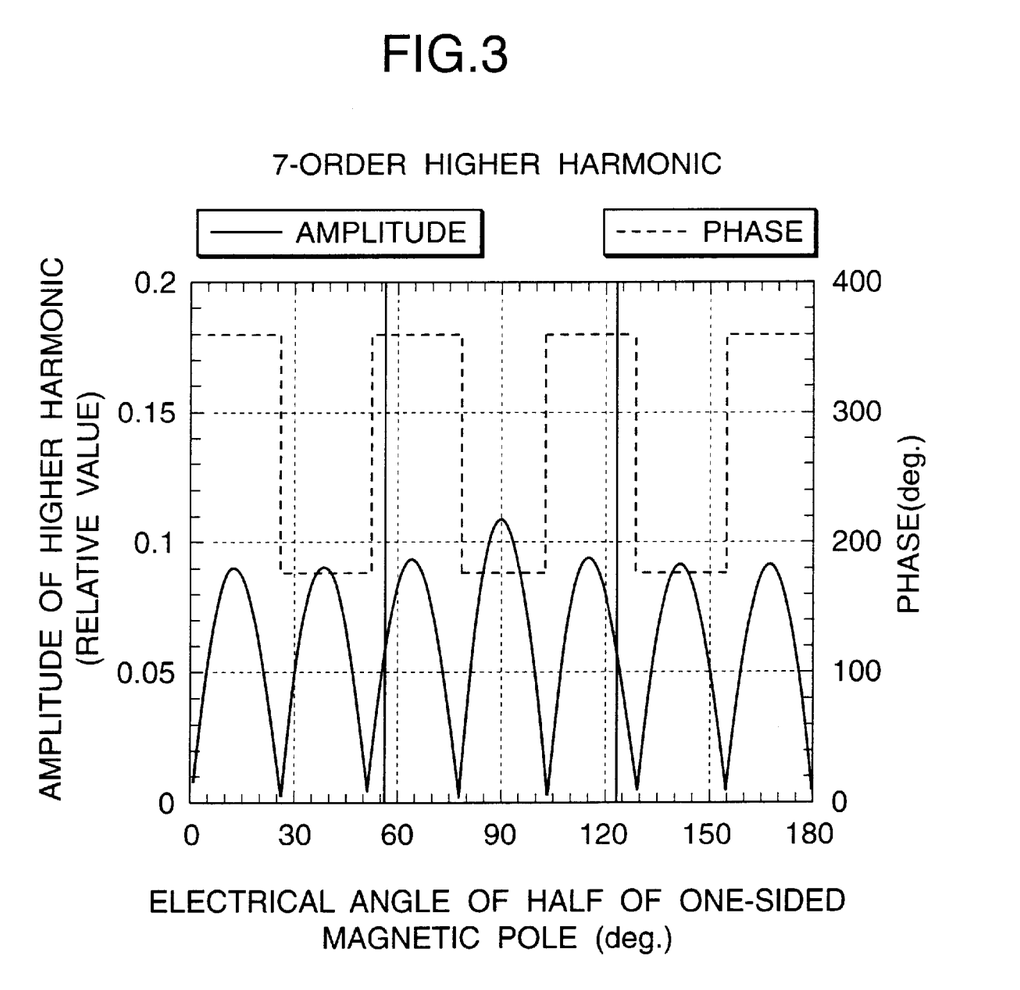
FIG. 3 is an illustration of the alternating current generator for vehicle of the first embodiment according to the invention.
Figure 4:
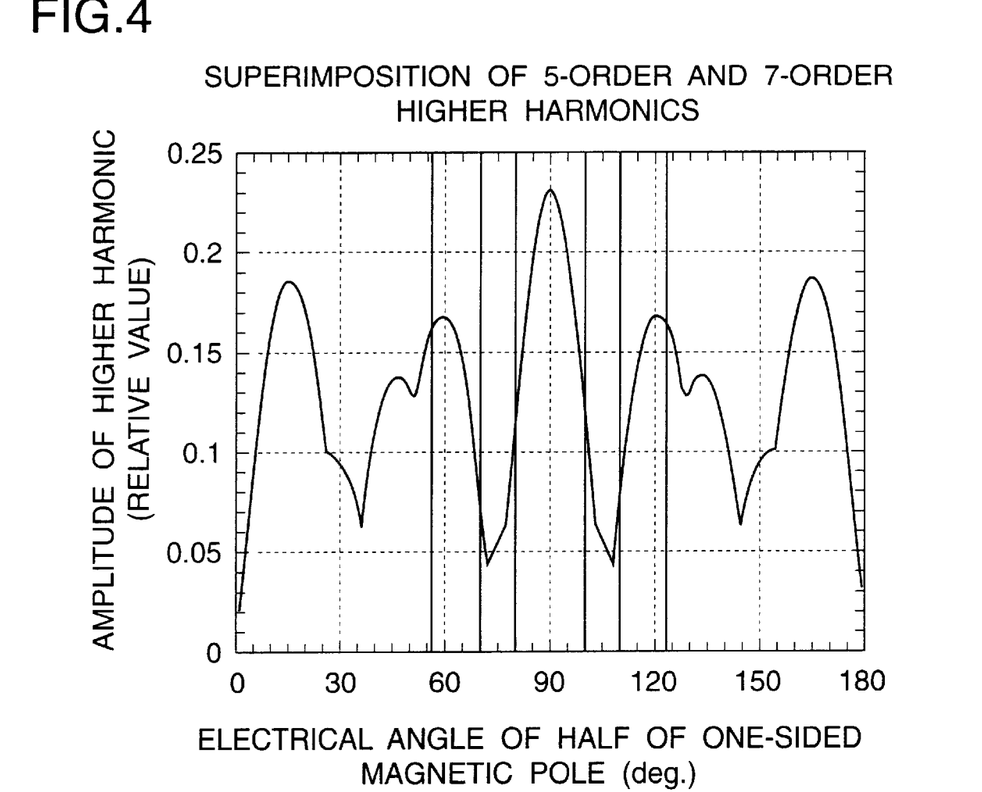
FIG. 4 is a composite view of a higher harmonic illustrating effects of the alternating current generator for vehicle of the first embodiment according to the invention.

FIGS. 1 to 4 are configuration views and illustrations of an alternating current generator for vehicle of a first embodiment according to this invention, and FIG. 1 is a plane view showing a shape of magnetic poles, and FIGS. 2 to 4 are illustrations of higher harmonics which generate a magnetic flux density and become a factor of noise. Also, the whole configuration of the alternating current generator for vehicle and a configuration of a rotor are similar to the above-mentioned conventional example shown in FIGS. 13 and 14, and only a configuration portion of the magnetic poles different from the conventional example will be described here. In FIG. 1, numeral 8 is a first rotor core provided in a rotor of the alternating current generator for vehicle and numeral 9 is a second rotor core. There are provided magnetic poles 23 and 24 which axially extend to the inner diameter of a 10 stator core 4 from the first rotor core 8 and the second rotor core 9 through a predetermined air gap and are arranged so as to have engagement alternately. The magnetic poles 23 and 24 comprise first parts 23a and 24a, and second parts 23b and 24b with a different width in the rotational direction, respectively, and they are stepwise formed in the axial direction, and also the first parts 23a and 24a are set to an electrical angle of 210° at a pitch between the centerlines shown by broken lines of gaps 25 and 26 between the magnetic poles, and the second parts 23b and 24b are also set to an electrical angle of 150° similarly.

Applied vibration force due to electromagnetic attraction force between the stator core 4 and each the magnetic pole 23, 24 mentioned as the cause of noise in the paragraph of the problems will be described in detail below. That is, in a three-phase alternating current generator where the number of slots 4a of the stator core 4 per phase every pole is one, the applied vibration force of the order of three times the number of magnetic poles to one rotation of the rotor of the generator appears remarkably, and the applied vibration force of the order of six times the number of magnetic poles to one rotation of the rotor has a little influence. Also on the contrary, in a three-phase alternating current generator where the number of slots 4a of the stator core 4 per phase every pole is two, the applied vibration force of the order of six times the number of magnetic poles to one rotation of the rotor appears remarkably, and the applied vibration force of the order of three times the number of magnetic poles to one rotation of the rotor has a little influence.

This applied vibration force of the order of three times the number of magnetic poles mainly occurs from a composite value of interaction between a 5p-order spatial higher harmonic to one rotation of the rotor of the rotor side and a 5p-order spatial higher harmonic due to a current of the stator coil side with interaction between a 7p-order spatial higher harmonic of the rotor side and a 7p-order spatial higher harmonic due to a current of the stator coil side in case where the number of magnetic pole pairs is p (p=P/2 if it is assumed that the number of magnetic poles is P). Also, the applied vibration force of the order of six times the number of magnetic poles mainly occurs from a composite value of interaction between a 11p-order spatial higher harmonic of the rotor side and a 11p-order spatial higher harmonic of the stator coil side with interaction between a 13p-order spatial higher harmonic of the rotor side and a 13p-order spatial higher harmonic of the stator coil side. Thus, in order to reduce the electromagnetic applied vibration force to improve electromagnetic noise, it is effective to reduce the 5p-order and 7p-order spatial higher harmonics of the rotor side in the generator where the number of slots per phase every pole is one and the 11p-order and 13p-order spatial higher harmonics in the generator where the number of slots per phase every pole is two.

This will be described in detail below using FIG. 17 employed in explanation of the conventional example. For the generator having the magnetic poles with substantially trapezoid as shown in FIG. 17, a widthwise dimension of two-dimensional cross section of the magnetic poles sectioned in a plane vertical to the rotating shaft 7, namely a line pitch between centerlines of the gaps between the adjacent magnetic poles straightly changes depending on an axial position, so that the amplitude and phase of the spatial higher harmonics continuously change depending on the axial position. In other words, each order component of the spatial higher harmonics exists with the order components continuously changing depending on the position of an arrow z-direction of FIG. 17 and the z position in which the order component of the spatial higher harmonics becoming a factor of the electromagnetic noise is increased exists, with the result that the electromagnetic applied vibration force of this order component brings about resonance of the stator core or the magnetic poles to increase the electromagnetic noise.

The amplitude and phase of the 5p-order higher harmonic among these order components of the higher harmonics to a pitch of the magnetic poles are shown in FIG. 2. The axis of abscissa of FIG. 2 indicates the pole pitch of the magnetic poles by an electrical angle, and the center of one magnetic pole is 0° and the center of the adjacent magnetic pole is π, namely 180° as shown in FIG. 17. Then, the centerline of the gaps between the magnetic poles exists in the range from 57° to 123° as shown by thin lines in FIG. 2, and also the range from 180° to 360° is symmetric with respect to a line of 180°.

In general, the 5p-order higher harmonic of such a generator is distributed between the pitch of the magnetic poles as shown in FIG. 2, and becomes the minimum value at positions of ±90°/5 around 90°, namely 72° and 108°, and also the phase of the higher harmonic reverses by 180° every 36° (180°/5) as shown by a broken line. FIG. 3 shows the 7p-order higher harmonic similarly and indicates that the phase reverses by 180° every 180°/7. As described above, in the three-phase alternating current generator where the number of slots of the stator core per phase every pole is one, the applied vibration force of the three times order appears remarkably and is generated by composition of the 5p-order spatial higher harmonic with the 7p-order spatial higher harmonic, and this is shown in FIG. 4.

FIG. 4 is the composition of the 5p-order spatial higher harmonic of FIG. 2 with the 7p-order spatial higher harmonic of FIG. 3 assuming that the peak value is 7:5, namely the peak value of n-order higher harmonics is 1/n). As is evident from FIG. 4, in a composite waveform of the 5p-order and the 7p-order, the small amplitude portions of the composite wave exist in the range from 70° to 80° and the range from 100° to 110° using an electrical angle, and it is indicated that if the interface between the magnetic poles, namely the centerline of the gap between the magnetic poles exists in positions of these small amplitude portions, the applied vibration force of the three times order is reduced and the electromagnetic applied vibration force decreases in the three-phase alternating current generator where the number of slots of the stator core per phase every pole is one and thereby the electromagnetic noise is reduced. Then, when the positions are replaced with a pitch between the centerlines of the gaps between the magnetic poles, the pitch corresponds to the range from 140° to 160° and the range from 200° to 220°.

In the alternating current generator for vehicle of the first embodiment of the invention, as shown in FIG. 1, the pitch between the centerlines of the gaps 25 and 26 between the magnetic poles is set to an electrical angle of 210° in the first parts 23a and 24a and is set to an electrical angle of 150° in the second parts 23b and 24b and is selected so that the amplitude of the electromagnetic applied vibration force of the three times order becomes small, with the result that the electromagnetic applied vibration force of the three times order to the magnetic poles 23 and 24 is considerably reduced and a configuration of the rotor capable of remarkably decreasing the electromagnetic noise by use in the generator where the number of slots of the stator core per phase every pole is one can be obtained.

Second Embodiment

Figure 5:
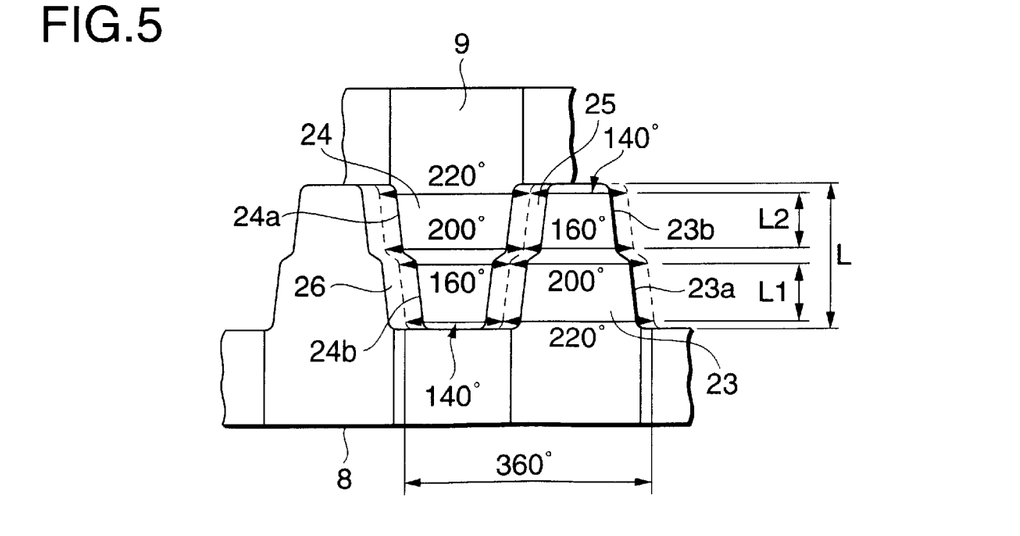
FIG. 5 is a plane view showing a shape of magnetic poles of an alternating current generator for vehicle of a second embodiment according to the invention.

FIG. 5 is a plane view showing a shape of magnetic poles of an alternating current generator for vehicle of a second embodiment according to the invention. This embodiment is implemented to reduce the electromagnetic applied vibration force of the three times order in a three-phase alternating current generator where the number of slots of the stator core per phase every pole is one similar to the first embodiment. In this embodiment, as shown in FIG. 5, magnetic poles 23 and 24 which axially extend from a first rotor core 8 and a second rotor core 9 comprise first parts 23a and 24a, and second parts 23b and 24b with a different width in the rotational direction, respectively. The first parts 23a and 24a are slantingly formed so that a pitch between the centerlines of gaps 25 and 26 between the magnetic poles is set to an electrical angle of 220° to 200°, and the second parts 23b and 24b are slantingly formed so that the line pitch is set to an electrical angle of 140° to 160°. By such a configuration, the pitch between the centerlines of the gaps between the magnetic poles is selected so that the amplitude of the electromagnetic applied vibration force of the three times order becomes small and the electromagnetic noise can be reduced similar to the first embodiment.

Third Embodiment

Figure 6:
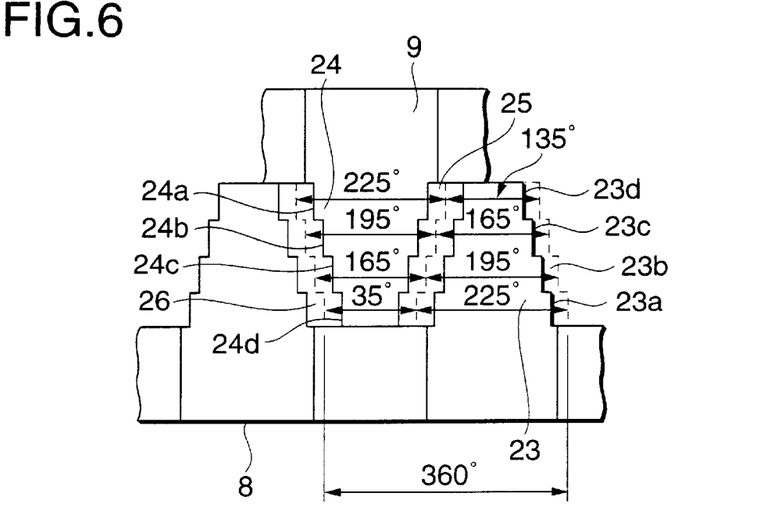
FIG. 6 is a plane view showing a shape of magnetic poles of an alternating current generator for vehicle of a third embodiment according to the invention.
Figure 7:
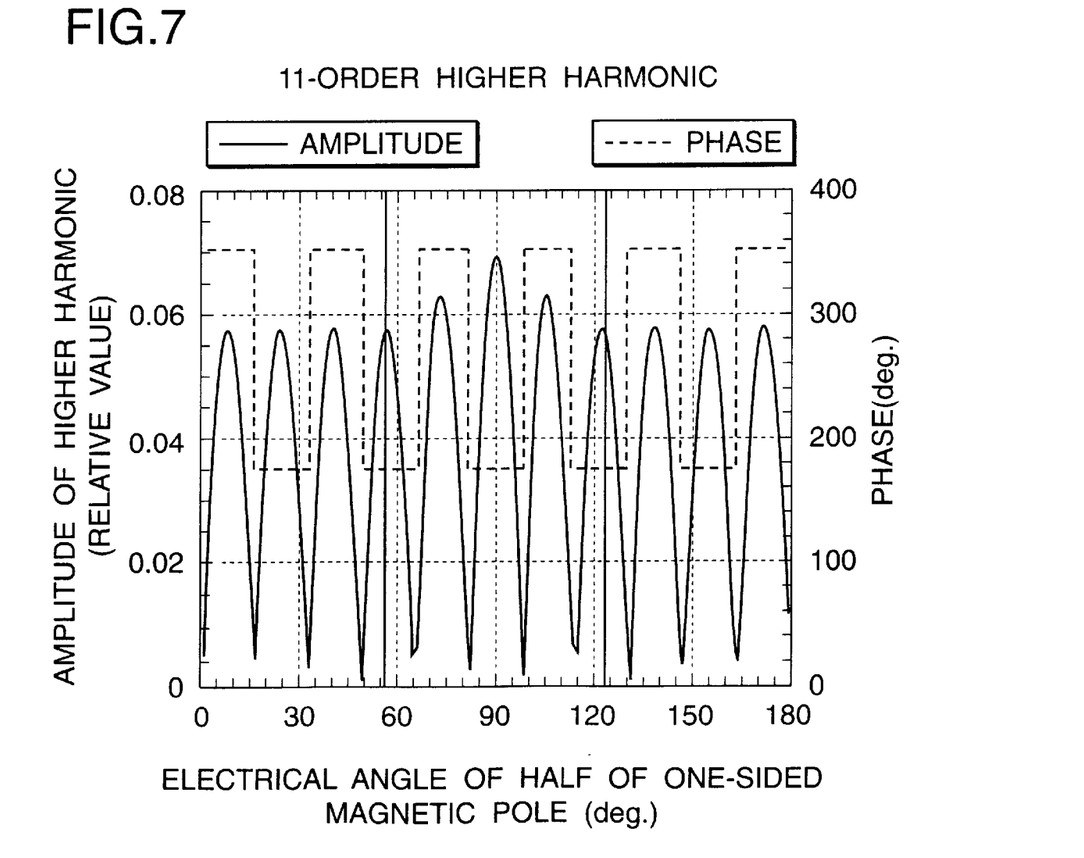
FIG. 7 is an illustration of the alternating current generator for vehicle of the third embodiment according to the invention.
Figure 8:
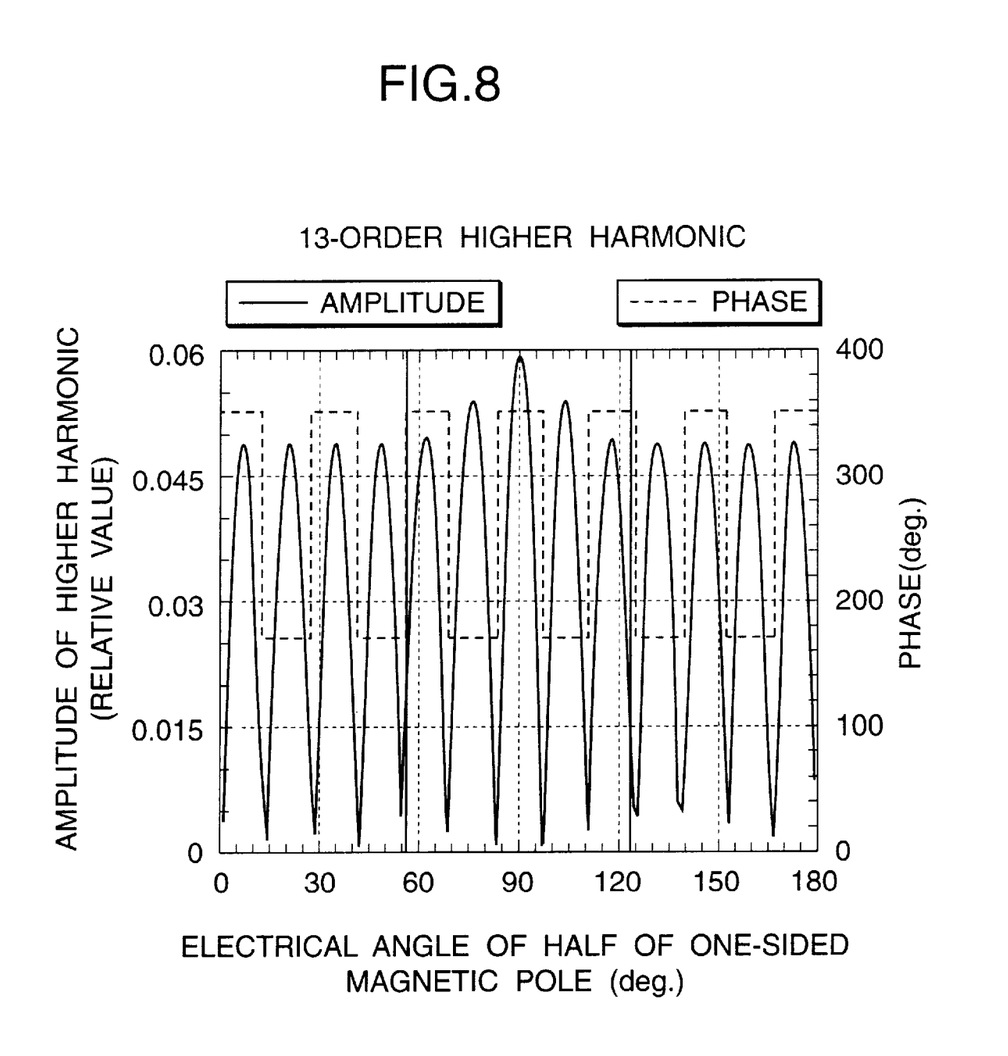
FIG. 8 is an illustration of the alternating current generator for vehicle of the third embodiment according to the invention.
Figure 9:
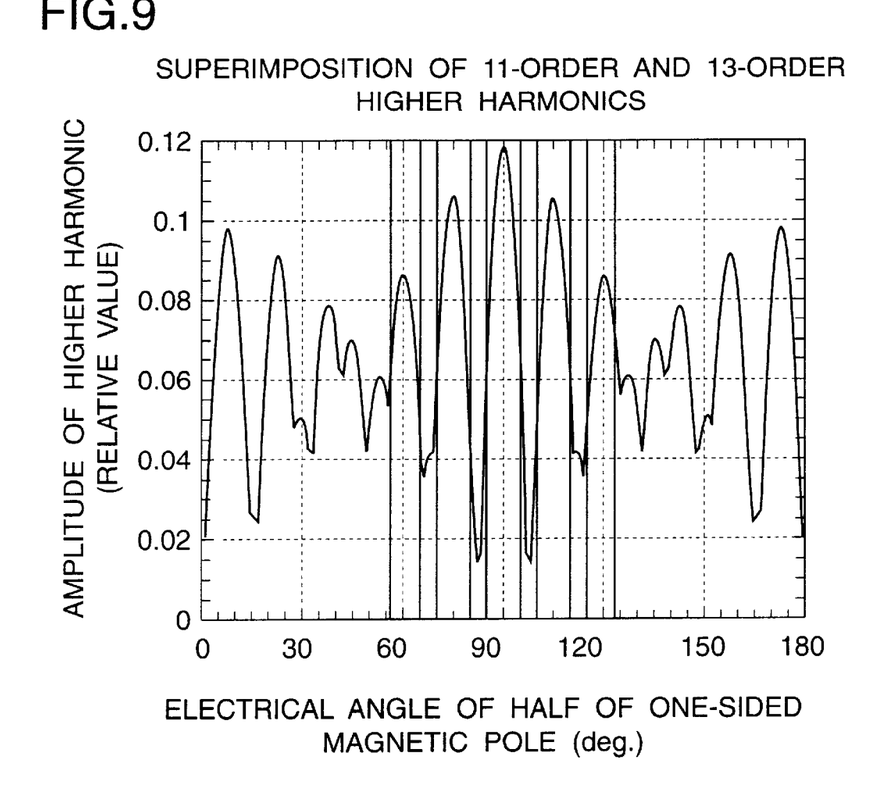
FIG. 9 is a composite view of a higher harmonic illustrating effects of the alternating current generator for vehicle of the third embodiment according to the invention.

FIGS. 6 to 9 are configuration views and illustrations of an alternating current generator for vehicle of a third embodiment according to the invention, and FIG. 6 is a axial plane view showing a shape of magnetic poles, and FIGS. 7 to 9 are illustrations of higher harmonics which generate a magnetic pole and become a factor of noise. This embodiment adapts to a three-phase alternating current generator where the number of slots of the stator core per phase every pole is two. As described in the first embodiment, in the case where the number of slots of the stator core is two, the applied vibration force of the order of six times the number of magnetic poles appears remarkably and is generated by composition of a 11p-order spatial higher harmonic with a 13p-order spatial higher harmonic. FIG. 7 shows the amplitude and phase of the 11p-order higher harmonic to a pitch of the magnetic poles, and FIG. 8 shows the amplitude and phase of the 13p-order higher harmonic to a pitch of the magnetic poles. Also, FIG. 9 is the composition of the 11p-order spatial higher harmonic of FIG. 7 with the 13p-order spatial higher harmonic of FIG. 8 assuming that the peak value is 13:11.

As is evident from FIG. 9, in a composite waveform of the 11p-order and the 13p-order, positions with the small amplitude of the applied vibration force of the six times order exist in the range from 65° to 70°, the range from 80° to 85°, the range from 95° to 100°, and the range from 110° to 115°. If the interface between the magnetic poles, namely the centerline of the gap between the magnetic poles exists in these positions, the applied vibration force of the six times order is reduced. Then, when the positions are replaced with a pitch between the centerlines of the gaps between the magnetic poles, the pitch exists in the range from 130° to 140°, the range from 160° to 170°, the range from 190° to 200°, and the range from 220° to 230°, and the electromagnetic applied vibration force decreases in these ranges.

On the other hand, in a shape of the magnetic pole, as shown in FIG. 6, a magnetic pole 23 extending from a first rotor core 8 and a magnetic pole 24 extending from a second rotor core 9 comprise four parts 23a and 24a, 23b and 24b, 23c and 24c, 23d and 24d with a different width in the rotational direction, respectively. Line pitches between the centerlines of gaps 25 and 26 between the adjacent magnetic poles shown by dotted lines are set to electrical angles of 225°, 195°, 165° and 135°, and the line pitches between the centerlines of the gaps between the magnetic poles are selected so that the amplitude of the electromagnetic applied vibration force of the six times order becomes small. By such a configuration, the electromagnetic applied vibration force of the six times order to the magnetic poles 23 and 24 is considerably reduced and a configuration of the rotor capable of remarkably decreasing the electromagnetic noise by use in the generator where the number of slots of the stator core per phase every pole is two can be obtained.

Fourth Embodiment

Figure 10:
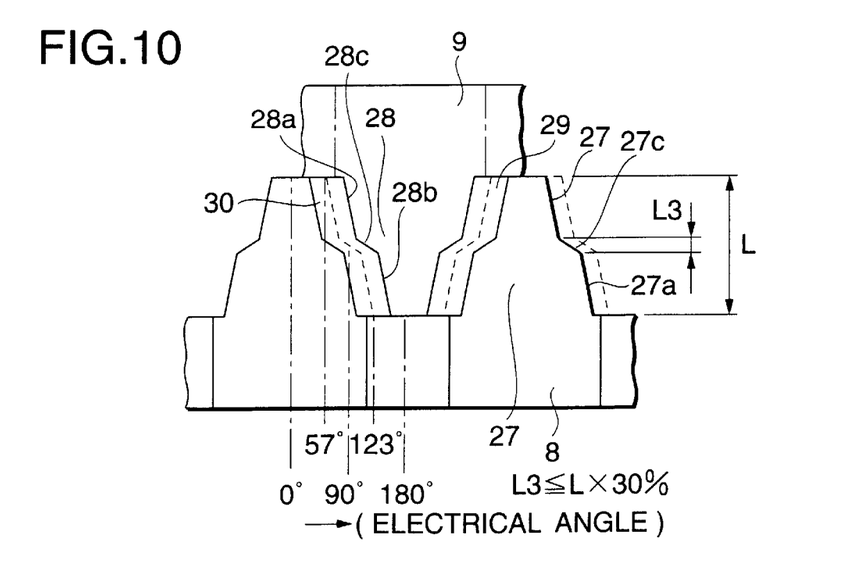
FIG. 10 is a plane view showing a shape of magnetic poles of an alternating current generator for vehicle of a fourth embodiment according to the invention.
Figure 11:
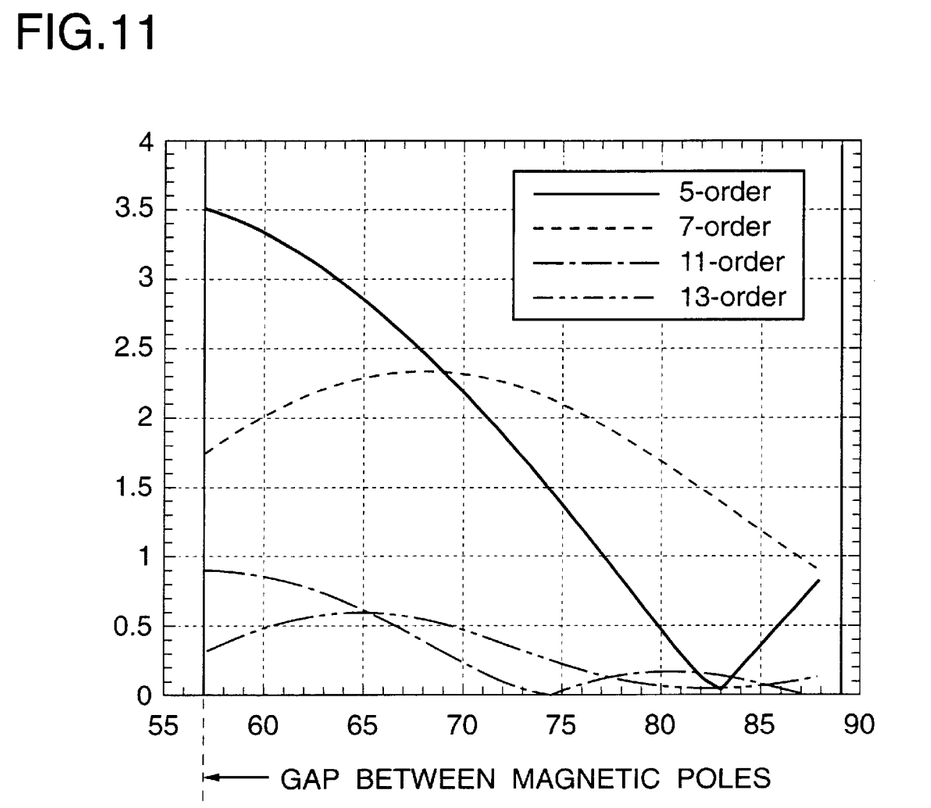
FIG. 11 is an illustration of the alternating current generator for vehicle of the fourth embodiment according to the invention.

FIG. 10 is a plane view showing a shape of magnetic poles of an alternating current generator for vehicle of a fourth embodiment according to the invention, and FIG. 11 is an illustration showing effect. In this embodiment, a magnetic pole 27 extending from a rotor core 8 and a magnetic pole 28 extending from a rotor core 9 are formed in a substantially trapezoid shape, and first trapezoid parts 27a and 28a with a wide width in the rotational direction and second trapezoid parts 27b and 28b with a narrow width in the rotational direction are provided, and parts 27c and 28c with a large angle of inclination in which a width of the magnetic pole changes sharply in the range of an axial length of L3 are provided in the center of the axial length of the magnetic poles 27 and 28 between the first trapezoid parts 27a and 28a and the second trapezoid parts 27b and 28b. Also, the axial length L3 of the parts 27c and 28c with a large angle of inclination is set to 30% or shorter to the whole axial length L of the magnetic poles 27 and 28.

In the first embodiment to third embodiment, the electromagnetic noise intends to be reduced by setting the magnetic poles 23 and 24 to a width of the rotational direction so that order components of the electromagnetic applied vibration force become small, but even if a large portion of the electromagnetic applied vibration force exists, the electromagnetic noise can be reduced by decreasing the value obtained by axially integrating this electromagnetic applied vibration force, and the integral value of the axial electromagnetic applied vibration force can be decreased by providing a portion in which the width of the rotational direction of the magnetic poles sharply changes, namely the pitch between the centerlines of the gaps between the magnetic poles sharply changes in the center of the longitudinal direction.

FIG. 11 shows a relationship of the axial integral value of the electromagnetic applied vibration force to a sharp change position of the pitch between the centerlines of the gaps between the magnetic poles, and as is evident from FIG. 11, the integral value of each order component of higher harmonics becomes small in the range from 80° to 90° using an electrical angle. By setting the centerlines shown by broken lines of gaps 29 and 30 between the magnetic poles from a position of this 90° with point symmetry, FIG. 11 becomes symmetric with respect to a line to the position of 90° and the range from 80° to 100° becomes a small range of the integral value of higher harmonics in the shape of the magnetic poles of FIG. 10. When the centerline of the gap 30 between the magnetic poles is set to the range from 57° to 123°, the ratio of both the ranges is (100–80)/(123–57)≈0.3. Also, since the position of 90° is the center between the magnetic poles, by setting the length L3 of inclination with sharp change to 30% or shorter to the axial length L of the magnetic poles 27 and 28 and setting the position to the center of the axial length, a sharp change portion of an angle of inclination can be set to the position in which the integral value of each order component of higher harmonics becomes small and thus reduction in electromagnetic noise can be achieved.

Fifth Embodiment

Figure 12:
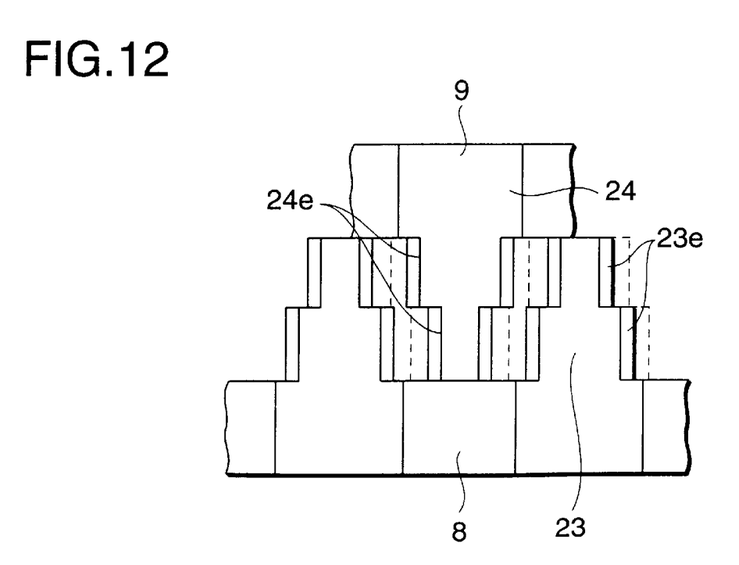
FIG. 12 is a plane view showing a shape of magnetic poles of an alternating current generator for vehicle of a fifth embodiment according to the invention.

FIG. 12 is a plane view showing a shape of magnetic poles of an alternating current generator for vehicle of a fifth embodiment according to the invention. In contrast to each embodiment described above, this embodiment is configured so that chamfered parts 23e and 24e for smoothing a magnetic flux density of the air gap formed between a stator core and corners to suppress electromagnetic noise are provided in the corners formed by the outer surface of each the magnetic pole opposite to the stator core and both sides of the rotational direction, and FIG. 12 shows the case of the first embodiment as a typical example. By such a configuration, the electromagnetic noise described above can be more effectively reduced.

Incidentally, the magnetic poles 23 and 24 or the magnetic poles 27 and 28 mentioned above have been described with reference to the case of a generator form in which the field coil rotates with the rotor core, but they can be similarly applied even to the case of a generator form in which the field coil fixed separately from the rotor core is provided and only the rotor core rotates, a so-called inductor rotation type generator.

According to an alternating current generator for vehicle of the invention as described above, a width of the rotational direction of magnetic poles, namely a pitch between the centerlines of gaps between the magnetic poles is not changed continuously and the width is stepwise changed so as to avoid order components of higher harmonics of electromagnetic applied vibration force, or a sharp change position of the width of the rotational direction is set to a part in which the axial integral value of the electromagnetic applied vibration force becomes minimum, so that electromagnetic noise resulting from the electromagnetic applied vibration force can be remarkably reduced and the alternating current generator for vehicle with excellent quietness can be obtained.

What is claimed is:

1. An alternating current generator for vehicle, comprising:

a stator core in which a three-phase stator coil is wound and inserted into slots, a first rotor core and a second rotor core which are provided in the side of an inner diameter of said stator core and rotate with a rotating shaft, a field coil for magnetizing said first and second rotor cores in different magnetic poles, and a plurality of magnetic poles which are provided so as to extend to an axial direction of said rotating shaft from said first and second rotor cores and are arranged so as to have engagement alternately through predetermined gaps between said magnetic poles and are opposite to the surface of the inner diameter of said stator core through an air gap, wherein said magnetic poles have a plurality of parts in the axial direction and are stepwise formed and the respective parts are set to different widths in a rotational direction, so that a pitch of the rotational direction between centerlines of the gaps between said adjacent magnetic poles is configured so as to change stepwise in the axial direction.

2. The alternating current generator for vehicle as defined in claim 1, wherein the pitch of the rotational direction between the centerlines of the gaps between said adjacent magnetic poles is set to the range from 200° to 220° in a first part and the range from 140° to 160° in a second part using an electrical angle.

3. The alternating current generator for vehicle as defined in claim 1, wherein the pitch of the rotational direction between the centerlines of the gaps between said adjacent magnetic poles is set to the range from 220° to 230° in a first part, the range from 190° to 200° in a second part, the range from 160° to 170° in a third part, and the range from 130° to 140° in a fourth part using an electrical angle.

4. The alternating current generator for vehicle as defined in claim 1, wherein corners formed by the surface opposite to the inner diameter of said stator core of said magnetic poles and both sides of the rotational direction are chamfered.

5. The alternating current generator for vehicle as defined in claim 1, wherein the number of slots per phase every pole provided in said stator core is one.

6. The alternating current generator for vehicle as defined in claim 1, wherein the number of slots per phase every pole provided in said stator core is two.

* * * * *